(12) United States Patent
Wu

(10) Patent No.: US 9,123,473 B2
(45) Date of Patent: Sep. 1, 2015

(54) STRUCTURAL CAPACITOR, CONNECTOR AND COMMUNICATION APPARATUS USING THE CONNECTOR

(75) Inventor: Wenjing Wu, Shenzhen (CN)

(73) Assignee: SHENZHEN TATFOOK TECHNOLOGY CO., LTD., Shenzhen, Guangdong Province (CN)

( * ) Notice: Subject to any disclaimer, the term of this patent is extended or adjusted under 35 U.S.C. 154(b) by 373 days.

(21) Appl. No.: 13/610,826

(22) Filed: Sep. 11, 2012

(65) Prior Publication Data

US 2014/0070903 A1    Mar. 13, 2014

(51) Int. Cl.
| | | |
|---|---|---|
| H01P 5/12 | (2006.01) | |
| H01G 4/28 | (2006.01) | |
| H01G 4/40 | (2006.01) | |
| H01P 1/205 | (2006.01) | |
| H01R 13/7197 | (2011.01) | |
| H01P 5/02 | (2006.01) | |

(52) U.S. Cl.
CPC . *H01G 4/28* (2013.01); *H01G 4/40* (2013.01); *H01P 1/2053* (2013.01); *H01R 13/7197* (2013.01); *H01P 5/026* (2013.01)

(58) Field of Classification Search
USPC ............ 361/295, 301.1, 301.3, 302, 307, 329
See application file for complete search history.

(56) References Cited

U.S. PATENT DOCUMENTS

| | | | | | |
|---|---|---|---|---|---|
| 2,982,896 | A | * | 5/1961 | Cleary et al. | 361/295 |
| 3,027,504 | A | * | 3/1962 | Clark | 361/295 |
| 4,389,762 | A | * | 6/1983 | Reeves | 29/25.42 |
| 5,229,911 | A | * | 7/1993 | Ditlya | 361/277 |

* cited by examiner

Primary Examiner — Robert Pascal
Assistant Examiner — Kimberly Glenn
(74) Attorney, Agent, or Firm — Cheng-Ju Chiang

(57) ABSTRACT

The present disclosure discloses a structural capacitor, a connector comprising the structural capacitor and a communication apparatus using the connector. The structural capacitor comprises a rod and a holder. The rod comprises a first section and a second section connected with the first section, and the holder comprises a through hole. The first section and the second section are fitted into the through hole to accomplish the connection between the first section and the second section in an axial direction. The connector of the present disclosure features a simple structure, a convenient manufacturing process and a low cost. The communication apparatus of the present disclosure has advantages such as a simple manufacturing process, parameters that can be easily guaranteed, a low processing cost and a stable product performance.

18 Claims, 5 Drawing Sheets

STRUCTURAL CAPACITOR, CONNECTOR AND COMMUNICATION APPARATUS USING THE CONNECTOR

FIELD OF THE INVENTION

The present disclosure generally relates to the technical field of microwave communication, and more particularly, to a structural capacitor, a connector comprising the structural capacitor and a communication apparatus using the connector.

BACKGROUND OF THE INVENTION

Connectors are used in electronic apparatuses for inputting/outputting electric power or signals. In communication apparatuses, connectors are mostly used as signal interfaces for inputting or outputting signals. A connector comprises a joint and a rod. The joint is adapted to connect with a communication cable, and the rod extends into the communication apparatus through a chamber hole in a chamber of the communication apparatus and is connected with a signal input or output component.

Currently, in a communication apparatus 1' in FIG. 1 having lightning protection requirements, a rod 110' of a connector is usually of a two-section type, and a structural capacitor 100' is additionally provided between the two sections of the rod 110'. The so-called structural capacitor 100' is a mechanical structure in a particular form which replaces a capacitive device to deliver the same function as the capacitive device.

For the existing connector 10' having the lightning protection function, the structural capacitor 100' thereof is variable; i.e., the two sections of the rod 110' are movably connected with each other and have a variable distance therebetween, and an insulative medium is disposed between the two sections of the rod 110'. Therefore, in order to make parameters of the communication apparatus 1' stable, the structural capacitor 100' must have an invariable capacitance; i.e., the two sections of the rod 110' must be fixed with respect to each other. Typically, an annular groove is disposed on the movable section of the rod 110', and then a snap ring 130' is inserted over the annular groove, with a diameter of the snap ring 130' matching a diameter of a chamber hole 21' of a chamber 20'. In addition, the chamber hole 21' is formed with a stepped side adjacent to the inside of the communication apparatus 1', i.e., the chamber hole 21' has a neck 22' (see FIG. 1), and the snap ring 130' abuts against the neck 22' to position the section of the rod 110' in an axial direction. Thus, the rod 110' is positioned in the axial direction through an interface of the connector 10' and the aforesaid neck 22', and the capacitance of the structural capacitor 100' becomes invariable so that the parameters of the communication apparatus 1' are stable.

In the process of researching on and practicing the prior art, the inventor of the present disclosure found that: the chamber hole 21' is required to have a very accurate length in the aforesaid structure; and otherwise, it will be impossible to install the connector 10' if the rod 110' is too long, or axial displacement will occur if the rod 110' is too short, which makes indices of the communication apparatus 1' unstable and causes deterioration in the performance. In addition, the process of processing the chamber hole 21' into a stepped hole is complex and it is difficult to ensure various dimensions and to carry out surface treatment, which leads to a low production efficiency and a high production cost.

SUMMARY OF THE INVENTION

In view of the aforesaid shortcomings in the prior art, a primary objective of the present disclosure is to provide a structural capacitor, a connector comprising the structural capacitor and a communication apparatus using the connector, which have advantages such as a simple and reliable structure, a low production cost and stable performances of the communication apparatus.

To achieve the aforesaid objective, the present disclosure adopts the following technical solutions.

The present disclosure provides a structural capacitor, which comprises a rod, an insulative medium and a holder. The rod comprises a first section and a second section joined with each other, with each of the first section and the second section being provided with a flange at the joint. The insulative medium is disposed between the first section and the second section to prevent short-circuiting between the first section and the second section. The holder comprises a through hole, a groove is disposed around an inner sidewall of the through hole, and the through hole is adapted to mate with the rod so that the first section and the second section are fitted into the through hole. The first section and the second section join with each other in an axial direction, and both the flange of the first section and the flange of the second section are embedded into the groove to accomplish the connection between the first section and the second section in the axial direction.

The present disclosure further provides a connector, which comprises a joint and a structural capacitor connected to the joint. The structural capacitor comprises a rod, an insulative medium and a holder. The rod comprises a first section and a second section joined with each other, with each of the first section and the second section being provided with a flange at the joint. The insulative medium is disposed between the first section and the second section to prevent short-circuiting between the first section and the second section. The holder comprises a through hole, a groove is disposed around an inner sidewall of the through hole, and the through hole is adapted to mate with the rod so that the first section and the second section are fitted into the through hole. The first section and the second section join with each other in an axial direction, and both the flange of the first section and the flange of the second section are embedded into the groove to accomplish the connection between the first section and the second section in the axial direction.

The present disclosure further provides a communication apparatus using the aforesaid connector. The communication apparatus may be a filter, a duplexer, a combiner or a tower-mounted amplifier. The communication apparatus comprises a chamber and a connector fixed on the chamber. The chamber is formed with a chamber hole. The connector comprises an outer conductor, an inner conductor and a structural capacitor connected with the inner conductor. The structural capacitor comprises a rod, an insulative medium and a holder. The rod comprises a first section and a second section joined with each other, with each of the first section and the second section being provided with a flange at the joint. The inner conductor is connected with the first section. The insulative medium is disposed between the first section and the second section to prevent short-circuiting between the first section and the second section. The holder comprises a through hole, a groove is disposed around an inner sidewall of the through hole, and the through hole is adapted to mate with the rod so that the first section and the second section are fitted into the through hole. The first section and the second section join with each other in an axial direction, and both the flange of the first section and the flange of the second section are embedded into the groove to accomplish the connection between the first section and the second section in the axial direction.

As compared to the prior art, the present disclosure has the following benefits:

1. two sections of a rod of the connector are fixed in an axial direction by means of a holder, and this has advantages such as a simple structure and easy processing;
2. as compared to the prior art in which the snap ring and the stepped hole are used for the fixing purpose, the connector of the present disclosure in which the two sections of the rod are fixedly connected by means of the holder features a simple structure, convenient processing, reliable positioning and a low production cost; and
3. by using the aforesaid connector in the communication apparatus of the present disclosure, it is much easy to ensure the stability of the structural capacitor so as to enhance the stability of the indices of products (i.e., to improve the performance of the products); and moreover, it is only necessary to process the chamber hole into a simple through hole instead of a stepped hole, so the production efficiency is further increased and the production cost of the communication apparatus products is decreased.

BRIEF DESCRIPTION OF THE DRAWINGS

To describe the technical solutions of embodiments of the present disclosure more clearly, the attached drawings necessary for description of the embodiments will be introduced briefly hereinbelow.

DETAILED DESCRIPTION OF THE INVENTION

Hereinbelow, the technical solutions of embodiments of the present disclosure will be described clearly and completely with reference to the attached drawings illustrating the embodiments of the present disclosure. Obviously, the embodiments described are only some of but not all of the embodiments of the present disclosure. Other embodiments obtained by those of ordinary skill in the art according to these embodiments of the present disclosure without making inventive efforts shall all be covered within the scope of the present disclosure.

Embodiment I

This embodiment provides a structural capacitor which has the following structure.

Figure 1:
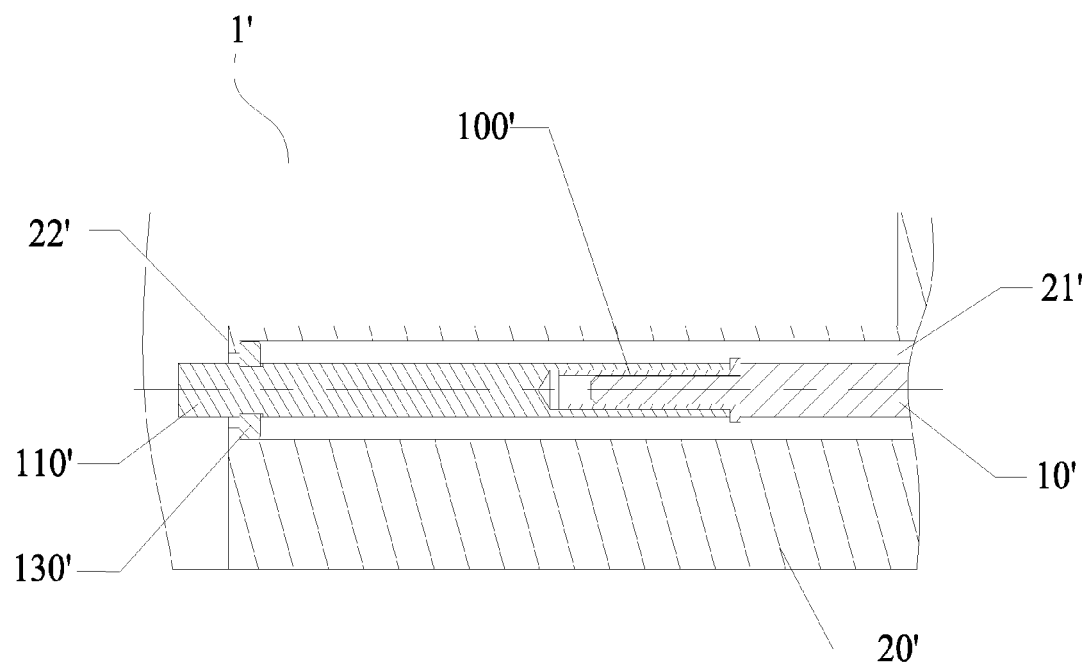
FIG. 1 is a schematic structural view of a structural capacitor and a communication apparatus in the prior art.
Figure 2:
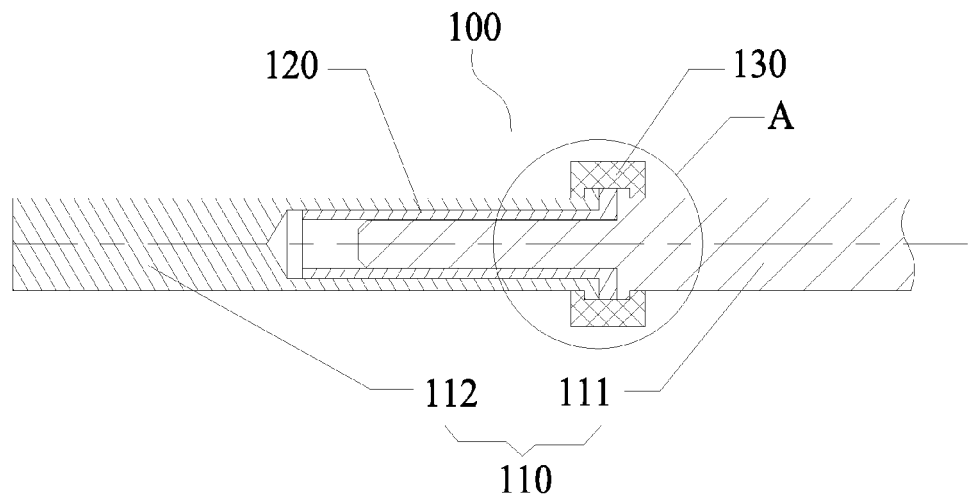
FIG. 2 is a schematic structural view of a structural capacitor according to an embodiment of the present disclosure.

Referring to FIG. 2, the structural capacitor 100 comprises a rod 110, an insulative medium and a holder 130. The rod 110 comprises a first section 111 and a second section 112 connected with the first section 111. Specifically, the first section 111 and the second section 112 join with each other in an axial direction. The insulative medium is disposed between the first section 111 and the second section 112 to prevent short-circuiting between the first section 111 and the second section 112. The holder 130 is adapted to accomplish the connection between the first section 111 and the second section 112 in the axial direction. It shall be appreciated that, the axial direction is a direction along an axis of the rod 110, which is parallel with a line connecting the first section 111 with the second section 112.

Figure 3:
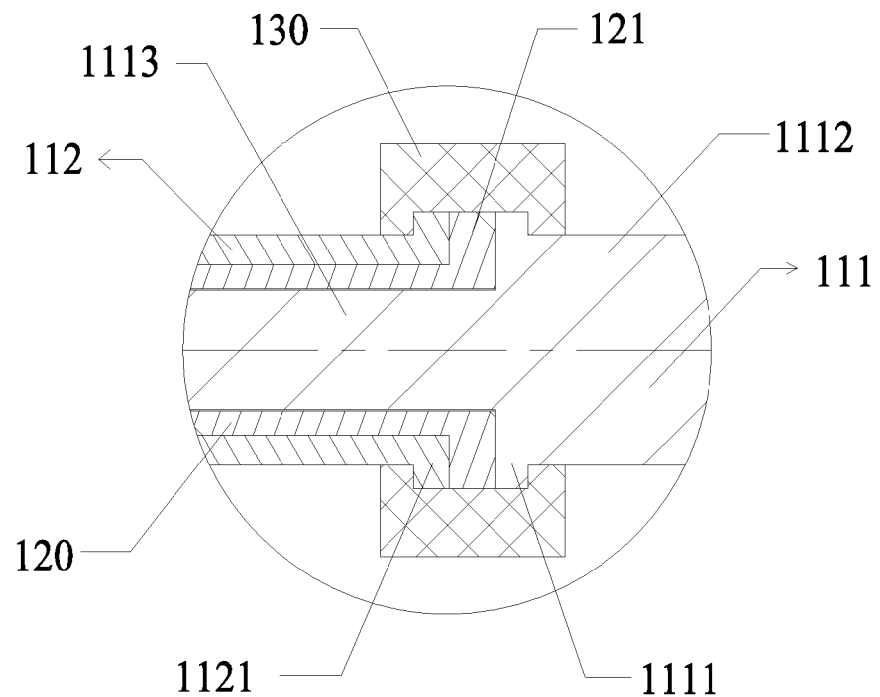
FIG. 3 is an enlarged view of a portion A in FIG. 2.

Specifically, referring to FIG. 3, there is shown an enlarged view of a portion A in FIG. 2. As shown in FIG. 3, the structural capacitor 100 is disposed between the first section 111 and the second section 112 in the following way. Specifically, the first section 111 comprises a major-diameter section 1112 and a minor-diameter section 1113, a cylindrical bushing 120 (i.e., the insulative medium) is inserted over the minor-diameter section 1113, and the bushing 120 is provided with a protruding edge 121 at a portion thereof adjacent to the major-diameter section 1112; and the second section 112 has a hollow structure which can be fitted over the bushing 120. In this way, the structural capacitor 100 with a variable capacitance is formed between the first section 111 and the second section 112.

Figure 4:
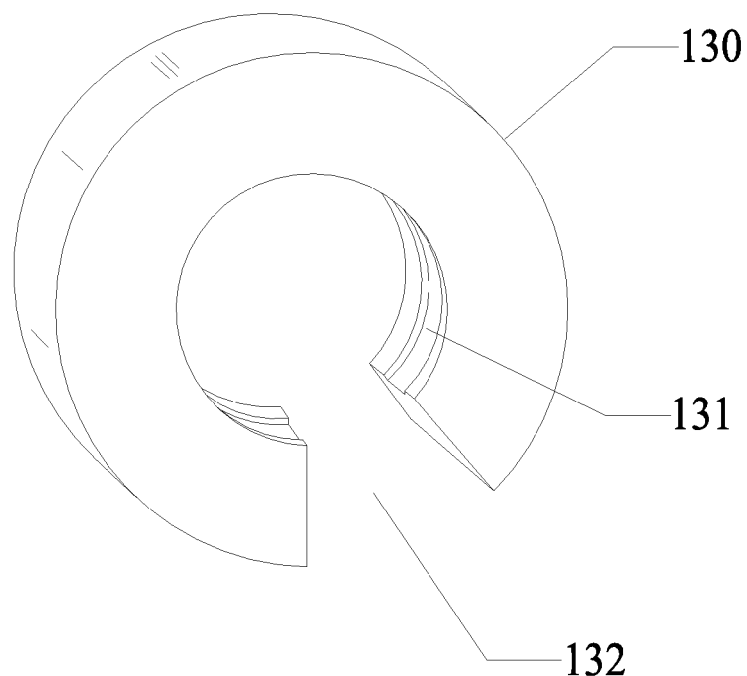
FIG. 4 is a schematic perspective view illustrating a structure of a holder according to an embodiment of the present disclosure.

As an implementation of this embodiment, the first section 111 and the second section 112 are provided with a flange 1111, 1121 respectively. The flange 1111 of the first section 111 is disposed at the joint between the major-diameter section 1112 and the minor-diameter section 1113, and the flange 1121 of the second section 112 is disposed at an end of the hollow structure. The two flanges 1111, 1121 preferably have the same diameter which is no smaller than a diameter of the protruding edge 121. Referring to FIG. 4, the holder 130 is a hollow structure such as an annular body or a tubular body. In other words, the holder 130 has a through hole, a groove 131 is disposed around an inner sidewall of the through hole, and the through hole is adapted to mate with the rod 110 so that the first section 111 and the second section 112 are fitted into the through hole of the holder 130. In addition, the flange 1111 of the first section 111, the protruding edge 121 of the bushing 120 and the flange 1121 of the second section 112 are embedded into the groove 131 to accomplish the connection between the first section 111 and the second section 112 in the axial direction. Of course, in other embodiments, it is also possible to dispose an engaging unit such as a protrusion on the holder 130 and to dispose a positioning groove mating with the protrusion on the first section 111 and the second section 112 so that the connection between the first section 111 and the second section 112 can be accomplished through the holder 130. This can be readily understood by people skilled in the art and, thus, will not be further described herein.

In practical applications, the inventor of the present disclosure found that: when the holder 130 is an annular body or a tubular body and is formed with an opening 132 in the axial direction with the minimum width of the opening 132 being slightly smaller than a diameter of the rod 110, it is very convenient to assemble the holder 130 onto the rod 110 so that the two sections of the rod 110 are fixed and are less likely to fall off. The holder 130 may be formed into an elastic cylindrical pin (as shown in FIG. 4), which will not be further described herein.

With the aforesaid structural concepts, the structural capacitor 100 of this embodiment has the following advantages: it has a simple structure, a convenient manufacturing process and a low cost, and can be conveniently popularized.

Embodiment II

Figure 5:
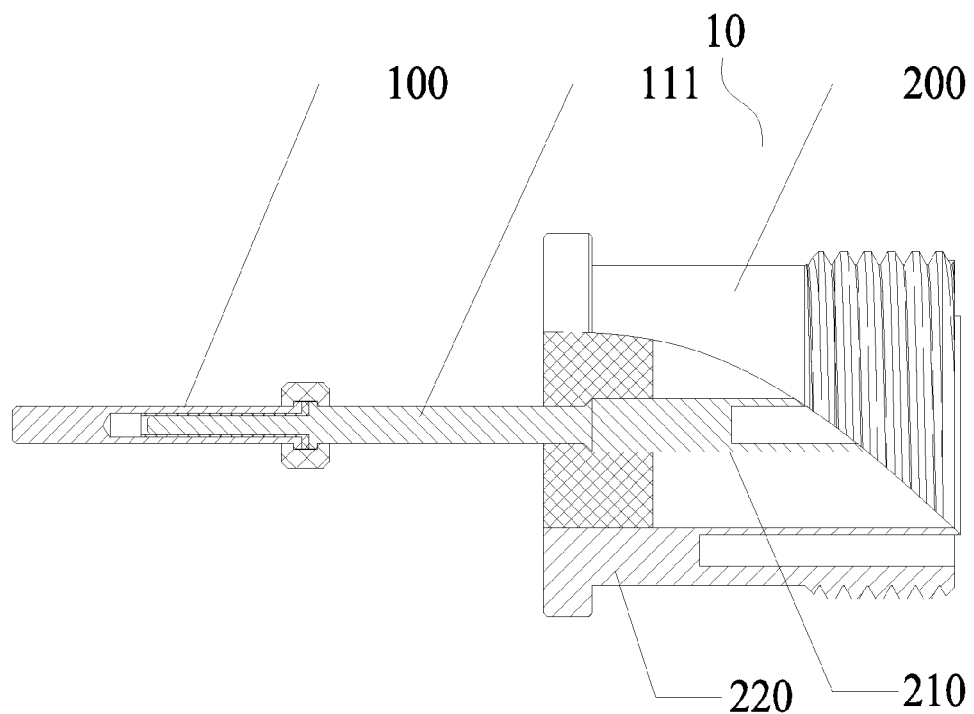
FIG. 5 is a schematic structural view of a connector according to an embodiment of the present disclosure.
Figure 6:
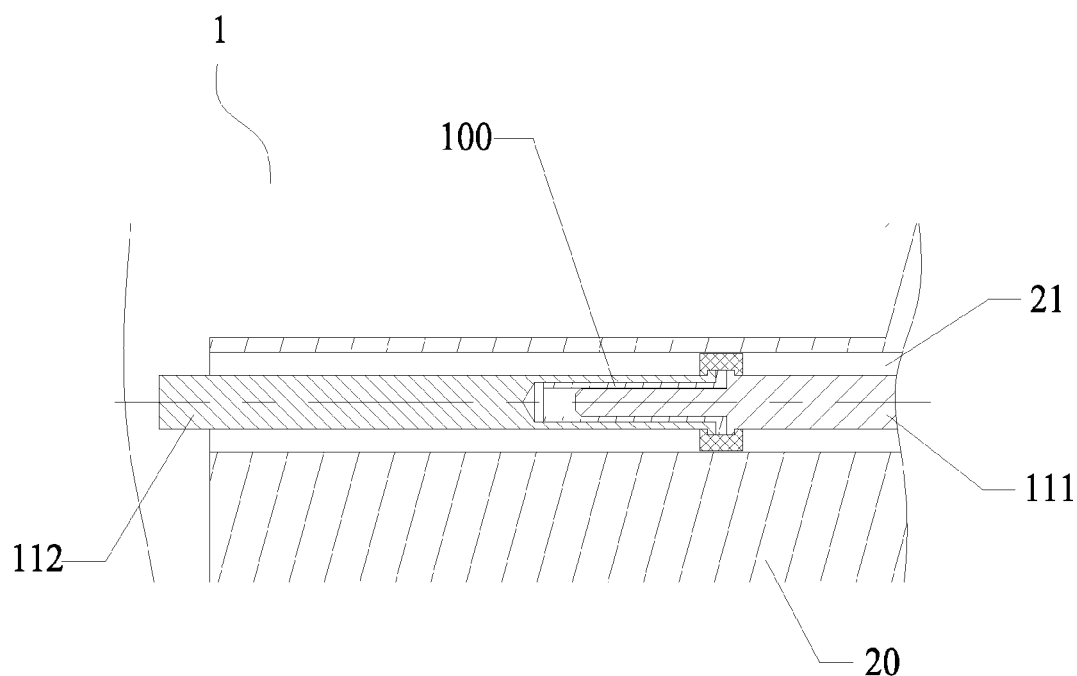
FIG. 6 is a partial cross-sectional view I of a communication apparatus according to an embodiment of the present disclosure.

Referring to FIG. 5, this embodiment provides a connector 10, which may be a coaxial connector. The connector 10 has the structural capacitor 100 as described in the embodiment I, and further comprises a joint 200 connected with an external communication cable. The joint 200 comprises an inner conductor 210 and an outer conductor 220 that are insulated from each other. The inner conductor is connected with the first section 111 of the structural capacitor 100, and the outer conductor 220 is mainly used for secure connection between the connector 10 and the communication cable, for the grounding purpose and so on. The connector 10 of this embodiment not only has the lightning protection function but also has a high reliability, and can conveniently keep the capacitance of the structural capacitor 100 stable at a definite value.

Embodiment III

This embodiment provides a communication apparatus 1, which uses the connector 10 as described in the embodiment II. The communication apparatus 1 herein includes but is not limited to a filter, a duplexer, a combiner and a tower-mounted amplifier. The connector 10 and the structural capacitor 100 of this embodiment are similar in structure to those of the embodiment I and, thus, will not be further described herein. Through use of the connector 10, the communication apparatus 1 of this embodiment has advantages such as a simple structure and stable performances.

Embodiment IV

This embodiment provides another communication apparatus 1. Hereinbelow, a duplexer will be taken as an example of the another communication apparatus 1, and the functions, principles and technical solutions thereof will be described in detail with reference to the attached drawings.

Figure 7:
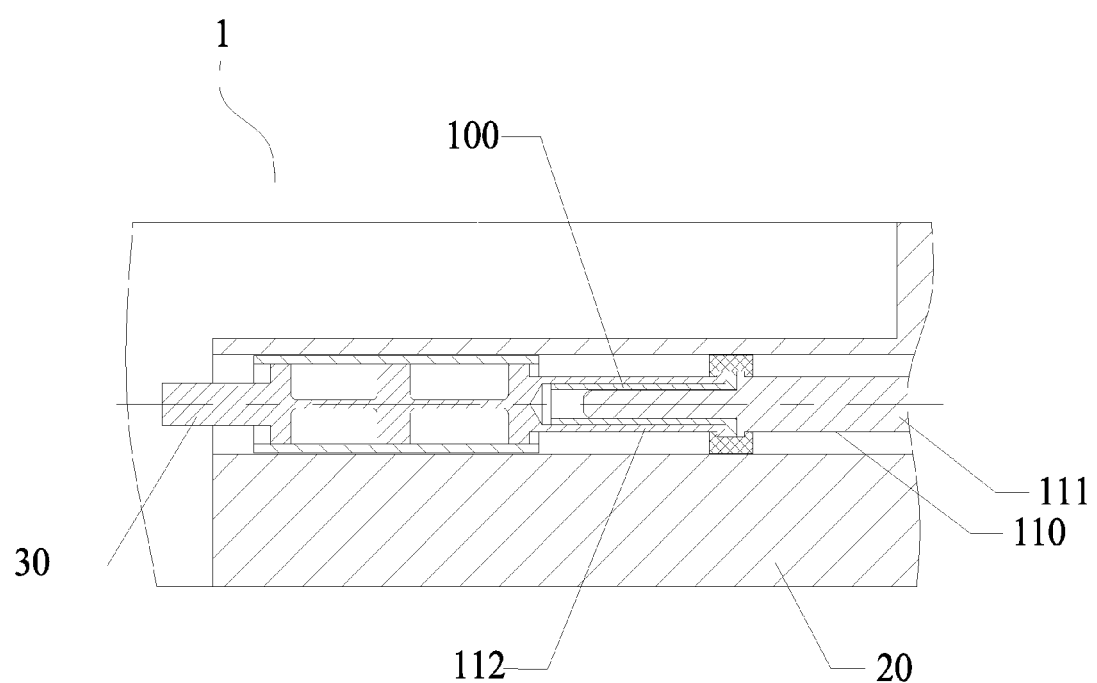
FIG. 7 is a partial cross-sectional view II of the communication apparatus according to the embodiment of the present disclosure.
Figure 8:
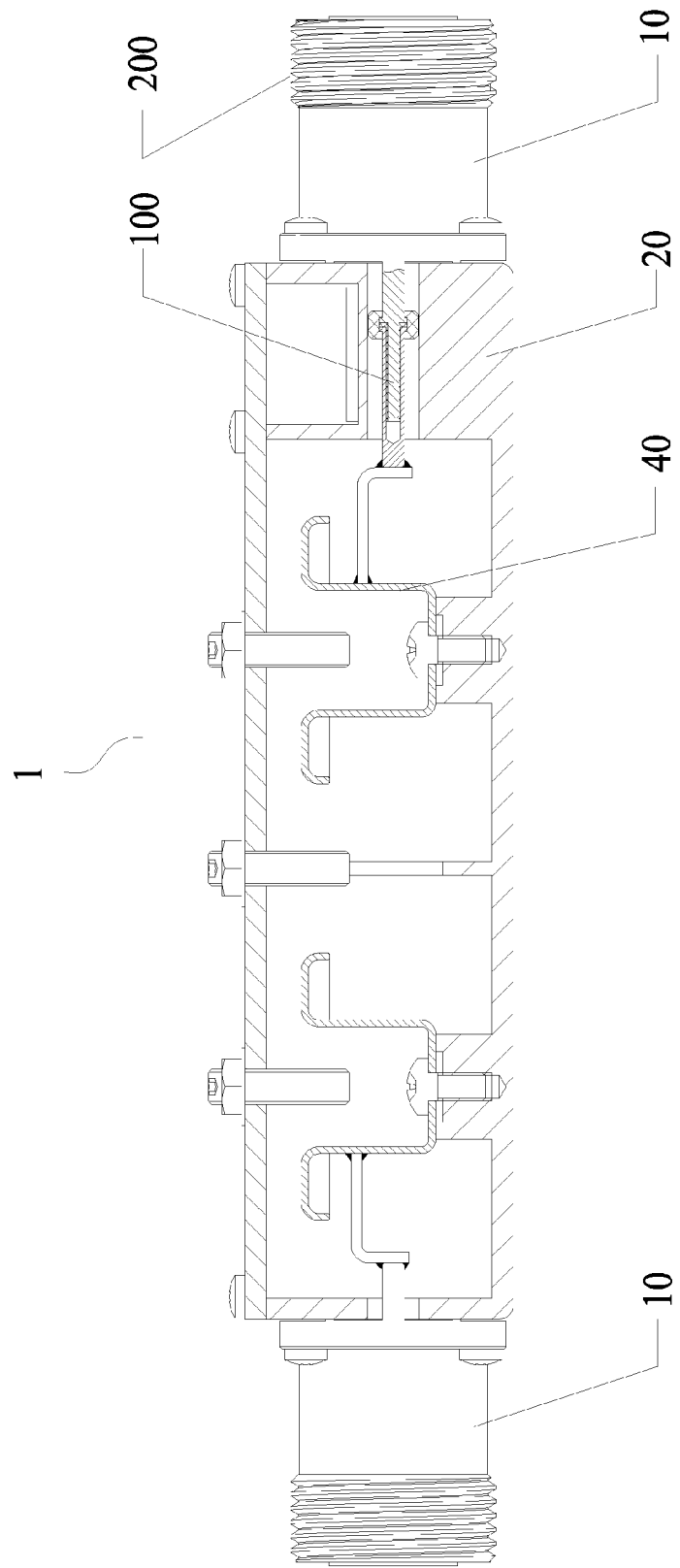
FIG. 8 is a schematic view illustrating an overall structure of the communication apparatus according to the embodiment of the present disclosure.

Referring to FIG. 5, FIG. 6, FIG. 7 and FIG. 8, the duplexer of this embodiment comprises a chamber 20 and a connector 10 fixed on the chamber 20; the chamber 20 is formed with a chamber hole 21; the connector 10 comprises a structural capacitor 100 and a joint 200; and the structural capacitor 100 comprises a rod 110, which extends into the chamber 20 through the chamber hole 21 and is connected with a corresponding input or output component 30 through a tap (see FIG. 7). The joint 200 of the connector 10 is fixed to the outside of the chamber hole 21 by a screw. The connector 10 of this embodiment is a coaxial connector, and the joint 200 comprises an outer conductor 220 and an inner conductor 210 which is connected with the structural capacitor 100. The structural capacitor 100 of this embodiment has the same structure as that of the embodiment I, so reference can be made to the embodiment I for the individual parts and related details of the structural capacitor 100 and these will not be further described herein.

The chamber hole 21 is a through hole having a consistent diameter. An outer diameter of the holder 130 is designed to match the diameter of the chamber hole 21 so that the holder 130 can be radially limited by the chamber hole 21 to enhance the stability of the performance of the duplexer. The chamber hole 21 may also be in the form (not shown) of a groove and a cover disposed on the chamber 20 and sealingly assembled with each other or in other forms.

Furthermore, in the duplexer of this embodiment, the second section 112 of the rod 110 may further be connected with a low-pass filter (referred to as LPF hereinbelow) 40 located within the chamber hole 21. The rod 110 of the connector 10 is connected with the input or output component 30 in the chamber 20 through the LPF 40, and this can effectively enhance the lightning protection effect (see FIG. 8).

According to the above descriptions, the duplexer of this embodiment uses the connector 10 of the aforesaid structure and, thus, is simple in structure and convenient in installation. More importantly, it is only necessary to simply process the chamber hole 21 mating with the connector 10 into a simple through hole because the problem that the chamber hole 21 would otherwise need to be processed into a stepped hole through which the rod 110 is axially positioned has been solved in the structural capacitor 100. As can be known from the above, the first section 111 and the second section 112 of the rod 110 are axially connected through the groove 131 formed in the holder 130 of the structural capacitor 100, so there is no need to additionally design other positioning components or positioning parts. In this way, it is only necessary to process the chamber hole 21 of the duplexer of this embodiment into a common through hole, which is particularly simple in manufacturing as compared to the prior art in which the chamber hole 21 is processed into a stepped hole. Moreover, it is much easy to guarantee individual parameters such as the surface roughness of the inner wall of the chamber hole 21, axial dimensions and treatment of flashes and burrs. Therefore, the duplexer of this embodiment can significantly improve the production efficiency, reduce the production cost and enhance the performance stability of products, and has a prominent competitive edge as compared to the conventional duplexer having the lightning protection function.

The principles and embodiments of the present disclosure have been elucidated with reference to specific examples herein. However, description of the above embodiments is only intended to facilitate understanding of the method and the core idea thereof of the present disclosure. Meanwhile, those of ordinary skill in the art can make variations on the embodiments and the application scope according to the idea of the present disclosure. Accordingly, what described in this specification shall not be construed as limitation of the present disclosure.

What is claimed is:

1. A structural capacitor, comprising:
   a rod, comprising a first section and a second section joined with each other, with each of the first section and the second section being provided with a flange at a first joint between the first section and the second section;
   an insulative medium, being disposed between the first section and the second section to prevent short-circuiting between the first section and the second section; and
   a holder, comprising a through hole, a groove being disposed around an inner sidewall of the through hole, the through hole being adapted to mate with the rod so that the first section and the second section are fitted into the through hole;
   wherein the first section and the second section join with each other in an axial direction, and both the flange of the first section and the flange of the second section are embedded into the groove to accomplish a connection between the first section and the second section in the axial direction.

2. The structural capacitor of claim 1, wherein the holder is an annular body and is formed with an opening in the axial direction, and a minimum width of the opening is smaller than a diameter of the rod.

3. The structural capacitor of claim 1, wherein the insulative medium is a cylindrical bushing formed with a protruding edge at an end thereof; the first section comprises a major-diameter section and a minor-diameter section at an end thereof, the flange is located at a second joint between the major-diameter section and the minor-diameter section, and when the bushing is inserted over the minor-diameter section and the second section is inserted over the bushing, the flange of the first section and the flange of the second section are opposed to each other and insulatedly separated by the protruding edge.

4. The structural capacitor of claim 3, wherein the holder is an annular body and is formed with an opening in the axial direction, and a minimum width of the opening is smaller than a diameter of the rod.

5. The structural capacitor of claim 3, wherein a diameter of the flange of the first section is equal to that of the flange of the second section, and a diameter of the protruding edge is no greater than the diameter of the flange of the first section or the diameter of the flange of the second section.

6. The structural capacitor of claim 5, wherein the holder is an annular body and is formed with an opening in the axial direction, and a minimum width of the opening is smaller than a diameter of the rod.

7. A connector, comprising a joint and a structural capacitor connected to the joint, the structural capacitor comprising:
 a rod, comprising a first section and a second section joined with each other, with each of the first section and the second section being provided with a flange at a first joint between the first section and the second section;
 an insulative medium, being disposed between the first section and the second section to prevent short-circuiting between the first section and the second section; and
 a holder, comprising a through hole, a groove being disposed around an inner sidewall of the through hole, the through hole being adapted to mate with the rod so that the first section and the second section are fitted into the through hole;
 wherein the first section and the second section join with each other in an axial direction, and both the flange of the first section and the flange of the second section are embedded into the groove to accomplish a connection between the first section and the second section in the axial direction.

8. The connector of claim 7, wherein the joint comprises an inner conductor and an outer conductor that are insulated from each other, and the inner conductor is connected with the first section.

9. A communication apparatus comprising a connector, the connector further comprising a structural capacitor, wherein the structural capacitor is as claimed in claim 1.

10. The communication apparatus of claim 9, wherein the communication apparatus is a filter, a duplexer, a combiner or a tower-mounted amplifier.

11. A communication apparatus comprising a chamber and a connector fixed on the chamber, the chamber being formed with a chamber hole, the connector comprising an outer conductor, an inner conductor and a structural capacitor connected with the inner conductor, the structural capacitor extending into the chamber through the chamber hole, the structural capacitor comprising:
 a rod, comprising a first section and a second section joined with each other, with each of the first section and the second section being provided with a flange at a joint between the first section and the second section;
 an insulative medium, being disposed between the first section and the second section to prevent short-circuiting between the first section and the second section; and
 a holder, comprising a through hole, a first groove being disposed around an inner sidewall of the through hole, the through hole being adapted to mate with the rod so that the first section and the second section are fitted into the through hole;
 wherein the first section and the second section join with each other in an axial direction, and both the flange of the first section and the flange of the second section are embedded into the first groove to accomplish a connection between the first section and the second section in the axial direction.

12. The communication apparatus of claim 11, wherein the communication apparatus is a filter, a duplexer, a combiner or a tower-mounted amplifier.

13. The communication apparatus of claim 11, further comprising a cover that seals a second groove disposed on the chamber to form the chamber hole.

14. The communication apparatus of claim 13, wherein the communication apparatus is a filter, a duplexer, a combiner or a tower-mounted amplifier.

15. The communication apparatus of claim 11, wherein the chamber hole is a through hole, a diameter of which matches an outer diameter of the holder to achieve radial positioning of the holder.

16. The communication apparatus of claim 15, wherein the communication apparatus is a filter, a duplexer, a combiner or a tower-mounted amplifier.

17. The communication apparatus of claim 11, wherein the second section of the rod is connected with a low-pass filter located within the chamber hole.

18. The communication apparatus of claim 17, wherein the communication apparatus is a filter, a duplexer, a combiner or a tower-mounted amplifier.

* * * * *